(12) United States Patent
Ormerod

(10) Patent No.: US 10,639,708 B2
(45) Date of Patent: May 5, 2020

(54) FORMING OF BATTERY COMPONENTS

(71) Applicant: TBS ENGINEERING LIMITED, Gloucester (GB)

(72) Inventor: Mark Ormerod, Cheltenham (GB)

(73) Assignee: TBS ENGINEERING LIMITED, Gloucester (GB)

( * ) Notice: Subject to any disclaimer, the term of this patent is extended or adjusted under 35 U.S.C. 154(b) by 217 days.

(21) Appl. No.: 15/557,738

(22) PCT Filed: Mar. 11, 2016

(86) PCT No.: PCT/GB2016/050684
§ 371 (c)(1),
(2) Date: Sep. 12, 2017

(87) PCT Pub. No.: WO2016/151285
PCT Pub. Date: Sep. 29, 2016

(65) Prior Publication Data
US 2018/0065174 A1    Mar. 8, 2018

(30) Foreign Application Priority Data

Mar. 13, 2015 (GB) .................................. 1504320.1

(51) Int. Cl.
*B22D 25/04* (2006.01)
*B22D 35/04* (2006.01)
(Continued)

(52) U.S. Cl.
CPC ................ *B22D 25/04* (2013.01); *B22C 9/06* (2013.01); *B22D 35/02* (2013.01); *B22D 35/04* (2013.01);
(Continued)

(58) Field of Classification Search
CPC ........ B22D 19/04; B22D 25/04; B22D 35/02; B22D 35/04; B22D 39/02; B22C 9/06
(Continued)

(56) References Cited

U.S. PATENT DOCUMENTS 1,442,730 A * 1/1923 Ohliger et al. ........ B22D 19/00
164/109
2,454,051 A * 11/1948 Galloway .............. B22D 25/04
249/79
(Continued)

FOREIGN PATENT DOCUMENTS

CN    101410206 A    4/2009
CN    102712033 A    10/2012
(Continued)

OTHER PUBLICATIONS

Extended Search Report for European application No. 18206797.5, dated Jan. 15, 2019.
(Continued)

*Primary Examiner* — Kevin P Kerns
(74) *Attorney, Agent, or Firm* — Marshall, Gerstein & Borun LLP

(57) ABSTRACT

A mould for forming battery components includes a first mould body having a first plurality of mould cavities and a second mould body having a second plurality of mould cavities. The first mould body and the second mould body are configured to be moveable between a moulding position in which the first plurality and second plurality of mould cavities are aligned, and a fill position in which the first plurality and second plurality of mould cavities are displaced from the aligned position and are proximal to a molten metal feed.

15 Claims, 7 Drawing Sheets

(51) Int. Cl.
*B22D 39/02* (2006.01)
*B22C 9/06* (2006.01)
*H01M 10/04* (2006.01)
*H01M 10/12* (2006.01)
*B22D 35/02* (2006.01)

(52) U.S. Cl.
CPC ....... *H01M 10/0404* (2013.01); *H01M 10/12* (2013.01); *B22D 39/02* (2013.01)

(58) Field of Classification Search
USPC ....... 164/129, 130, 322, 108, 109, 110, 332, 164/333, 334, 133, 337; 249/82, 83
See application file for complete search history.

(56) References Cited

U.S. PATENT DOCUMENTS

| | | | |
|---|---|---|---|
| 4,158,382 A | 6/1979 | Oxenreider et al. | |
| 4,241,780 A * | 12/1980 | Eberle | B22D 25/04 164/108 |
| 4,341,256 A * | 7/1982 | Eberle | B22D 25/04 164/109 |
| 5,505,744 A | 4/1996 | Eberle et al. | |
| 6,708,753 B1 | 3/2004 | Brantley | |
| 2011/0146934 A1 | 6/2011 | Neal et al. | |
| 2014/0116637 A1 * | 5/2014 | Barge et al. | B22D 39/02 164/271 |

FOREIGN PATENT DOCUMENTS

| | | |
|---|---|---|
| CN | 103394669 A | 11/2013 |
| CN | 103568194 A | 2/2014 |
| DE | 2426076 A1 | 12/1974 |
| GB | 1126818 A | 9/1968 |
| GB | 2505862 A | 3/2014 |
| GB | 2507485 A | 5/2014 |
| JP | H02210754 A | 8/1990 |
| JP | H10261398 A | 9/1998 |
| KR | 20140115524 A | 10/2014 |
| WO | WO-94/16466 A1 | 7/1994 |
| WO | WO-2007/128958 A1 | 11/2007 |
| WO | WO-2014148674 A1 | 9/2014 |
| WO | WO-2014175492 A1 | 10/2014 |

OTHER PUBLICATIONS

Chinese Office Action for appplication No. 201680015324.X dated Nov. 23, 2018.
International Search Report for International application No. PCT/GB2016/050684, dated Aug. 17, 2016.
British Search Report for Great Britain Application No. GB1504320.1, dated Jan. 30, 2017.
British Search Report for Great Britain Application No. GB1504320.1, dated Sep. 14, 2015.

* cited by examiner

FORMING OF BATTERY COMPONENTS

FIELD OF INVENTION

The present invention generally relates to the forming of battery components and in particular, but not exclusively, to such apparatus for use in manufacturing cast on straps during the manufacture of batteries. More specifically the invention relates to a mould for forming battery components, a cast on strap machine for moulding battery components and a lead delivery apparatus for a cast on strap machine.

BACKGROUND OF INVENTION

In the manufacture of batteries, particularly for example lead acid batteries, it is known to cast connectors known as "straps" and other formations onto the "lugs" (or "tabs") of battery plates. For example, straps are formed to provide a connection between a set of plates within a cell of the battery. Straps are generally cast using a "cast on strap machine" in which a mould cavity is filed with molten metal (normally molten lead) before the lugs of a group of battery plates are dipped into the cavity prior to the cooling of the lead. The mould for forming such straps general comprises a plurality of cavities each configured to form a separate strap across a "pack" or "group" comprising a plurality of battery plates. The mould may for example include a series of generally paired cavities spaced along the length of the mould such that each pair of cavities can form a positive and negative strap for a single group of batteries (and with the mould, therefore, forming a plurality of groups spaced along the length in a single process).

Typically, the mould cavities are filled by allowing lead to flow into channels at the sides of the cavities and spill over a weir into the mould. An example of such a moulding apparatus is shown in the Applicant's earlier published PCT Application WO94/16466. In order to ensure a good connection between the lugs and casting, the lead must remain hot until the lugs are in position. However, in order to minimise cycle time in production, the lead must be cooled as quickly as possible once the plates are in position.

It is important that the volume of lead is carefully controlled during strap casting as excess lead (for example as a result of mould features such as weirs) will have an impact on both the cost and weight of the final battery produced.

As such, the Applicants have recently proposed a new battery moulding apparatus in published UK Patent Application GB2507485. In this arrangement a reciprocating sliding block is used to provide an accurately measured volume of lead for each cavity of a mould.

Embodiments of the invention seek to provide further improvements over the arrangement proposed in GB2507485 which may for example, further reduce the cycle time and/or further improve consistent measuring of lead and/or provide delivery of lead with minimal cooling during transit to the mould and/or provide improved ease of maintenance or usage of the apparatus.

SUMMARY OF INVENTION

According to the first aspect of the present invention there is provided a mould for forming battery components (which may for example be cast on straps) the mould comprising a first mould body comprising a first plurality of mould cavities; a second mould body comprising a second plurality of mould cavities; wherein the first mould body and the second mould body are configured to be moveable between: a moulding position in which the first plurality and second plurality of mould cavities are aligned; and a fill position in which the first plurality and second plurality of mould cavities are displaced from an aligned position and are proximal to a molten metal feed.

The applicants have recognised that by providing mould portions which may be separately moved they can be positioned proximal to a molten metal feed such that the run of molten metal into the mould cavity may be minimised. For example, the molten metal may be poured directly into the cavity. Equally, by moving the mould portions back to an aligned position (which may for example be fixed relative to a predetermined datum) a group of battery plates may be aligned relative to the mould cavities without being impeded by the metal feed. Thus embodiments of the invention may reduce or mitigate issues related to cooling of the metal prior to forming of the straps and may, for example, avoid the need to provide additional heated channels or passageways between the lead supply and the cavities.

In the aligned position the first and second mould bodies may be arranged to provide a single moulding apparatus. The first and second mould bodies may, for example, abut in the aligned position.

Typically, the mould may be an elongate mould and may define a series of mould cavities spaced along a longitudinal direction of the mould. The first mould body and the second mould body may each comprise a longitudinal half of the elongate mould. Thus, in the aligned position the first mould body and second mould body may generally abut along a longitudinal centreline of the mould.

The first plurality of mould cavities and the second plurality of mould cavities may jointly define a plurality of pairs of mould cavities spaced along the longitudinal direction of the mould. Thus, for example it will be appreciated that, in use, each pair of cavities may be used for casting a pair of straps for a single group of battery plates. Each pair of mould cavities may include a cavity in each mould body.

The mould may be used with a modified cast on strap machine which includes a mould positioner. Thus, according to a further aspect of the invention there is provided a cast on strap machine for moulding battery components, the machine comprising: a molten metal delivery apparatus; a battery plate positioning device; and, a mould comprising a first mould body comprising a first plurality of mould cavities and a second mould body comprising a second plurality of mould cavities; and wherein the machine further comprises: a mould positioner configured to move the first mould body and the second mould body between: a moulding position in which the first plurality and second plurality of mould cavities are in an aligned position, and are aligned relative to the battery plate positioning device; and, a fill position in which the first plurality and second plurality of mould cavities are displaced from the aligned position, and are proximal to an outlet of the metal delivery apparatus.

The molten metal delivery apparatus may be arranged for delivering a predetermined volume of lead to the mould. Typically, the molten metal may be molten lead. The metal delivery apparatus may, for example, be arranged to measure and supply a predetermined volume of lead substantially in the manner described in UK Patent Application GB2507485.

The battery plate positioning device may for example be arranged to hold and position groups of battery plates relative to the mould. For example, the battery plate positioning device may be a jig box. It will be appreciated that the battery plate positioning device is generally arranged to position a group of battery plates relative to the mould during casting such that the tabs of a group of battery plates can be moved into the mould cavities and the lead can solidify so as to form straps connecting the tabs. Advantageously, as the mould bodies are moveable between the fill position and the moulding position the positioning of the battery plates may be unimpeded by the metal delivery apparatus or other metal delivery features when the mould bodies are in the moulding position.

The molten metal delivery apparatus may comprise first and second molten metal delivery apparatuses associated respectively with the first and second mould bodies. For example, a molten metal delivery apparatus may be provided adjacent to each of the first and second mould bodies. The first and second molten metal delivery apparatuses may be positioned on opposing sides of the cast on strap machine with the mould provided between the metal delivery apparatuses.

The first and second molten metal delivery apparatuses may be fed from a common lead supply.

The first and second molten metal delivery apparatuses may each comprise a plurality of outlets. One outlet may, for example, be associated with each of the mould cavities. The, or each, outlet may comprise a through-cavity formed in a slideably mounted block and arranged to receive lead into the upper end of the through cavity when the block is in a first position and release lead from the lower end of the through cavity when the block is in a second position. The, or each, outlet may be associated with a local metal reservoir.

The, or each, outlet is arranged to dispense lead directly into a mould cavity when the mould bodies are in the fill position.

The mould positioner is arranged to move the first mould body and the second mould body linearly. For example, the mould positioner may slide the first and second mould bodies outwardly away from a nominal longitudinal centre line of the mould when moving from the moulding position to the fill position (and moving the bodies towards the nominal centre line when moving to the moulding position).

The mould positioner may be arranged to reciprocate the first mould body and second mould body between the moulding and fill positions in use. The mould positioner may include a crank mechanism connected to the first and second mould bodies. A single drive may be provided with opposing out of phase crank arms for moving the first and second mould bodies. Advantageously, a crank mechanism may progressively decelerate the mould bodies as they approach the end positions of the motion (i.e. the fill and moulding positions) which is particularly important when the mould is being moved with the cavities filled with molten metal.

The molten metal delivery apparatus may be configured such that when the first and second mould bodies are in the fill position the mould bodies are heated by heat transfer from the delivery apparatus. For example, the mould bodies may be positioned adjacent to a hot surface of the molten metal delivery apparatus such that it is heated by radiant or conductive heat transfer. Advantageously such an arrangement may remove the need to provide any direct heating to the mould bodies.

The cast on strap machine may further be provided with a mould loading apparatus.

Thus, according to a further aspect of the invention, there is provided a cast on strap machine comprising a molten metal delivery apparatus; a battery plate positioning device; a mould comprising a plurality of mould cavities; and a mould loading apparatus arranged to move the mould between an in use configuration and a configuration in which the mould is external to the cast on strap machine to allow access to the mould.

The mould loading apparatus may be arranged to automate the removal and insertion of the mould into the cast on strap machine. For example, the mould loading apparatus may be utilised to service or interchange the mould during use.

The mould loading apparatus may comprise an elevator arranged to raise/lower the mould between a first height corresponding to the plane of the in use position of the mould and a second height where the mould is positioned out of the in use plane. By moving the mould out of the plane of the in use position it may be raised above or below the lead delivery apparatus such that it can be conveniently be moved into or out of the cast on strap machine. For example, the elevator may be arranged to lower the mould below the plane of a base member of the operational section of the cast on strap machine.

The mould loading apparatus may further comprise a lateral positioning member. The lateral position arrangement may be arranged to move the mould between an internal position, in alignment with the in use configuration, and an external position in which the mould is positioned to a side of the cast on strap machine. The lateral positioning arrangement may move the elevator.

The lateral positioning arrangement may comprise a fixed support frame and a moveable frame slideably mounted thereto. The lateral positioning arrangement may be below the working area of the cast on lead machine.

The mould loading apparatus may comprise a cradle for supporting the mould. The cradle may, for example, be provided on the elevator. An ejection device may be provided for removing the mould from the cradle when the mould is in the in use configuration.

According to a further aspect of the invention there is provided a lead delivery apparatus for a cast on strap machine arranged to deliver a predetermined volume of molten lead to a mould, comprising: a housing defining a lead reservoir having a lead outlet defined in its base and in communication with the reservoir; a runway beneath the base, spaced from the base and substantially parallel thereto; a block slideably mounted between the base and the runway, the block having a through cavity defining the predetermined volume for receiving lead from the outlet of the reservoir in a first position and for releasing the lead in a second position; and a mechanism for reciprocating the block between the first and second positions; and characterised in that the apparatus further comprises a clamp arranged to selectively secure an upper portion of the housing such that the housing and/or block may be removable.

The clamp may comprise a pivotable clamping member. The clamping member may be pivotally connected to the apparatus at, or proximal to, a first end of a fastener for securing the clamping member in a closed configuration. The fastener may comprise quick release mechanism. The fastener may engage at, or proximal to, a free end of the clamping member.

The clamp and reservoir housing may be provided with interconnecting features which fix the housing relative to the clamp (and therefore relative to the housing) when the clamp is in a closed configuration. The interconnecting features may comprise a projection on one of the housing or clamp and a corresponding aperture defined by the other of the clamp or housing. The clamp may be configured such that the projection is retained in the aperture when the clamp is in the closed configuration. For example, the aperture may be defined by a notch or recess in the clamp. The notch or recess may be defined in the pivotable clamping member or in an opposing surface thereof, or jointly defined by the profile of such opposing surfaces. For example the clamping member and opposing surface (which may for example be a fixed member of the clamp from which the clamping member is pivoted) may have stepped profiles which in the closed position jointly define the aperture.

The clamp may further comprise a reservoir cover. The reservoir cover may close an upper portion of the reservoir when the clamp is in a closed configuration. The reservoir cover may be pivotally connected to the clamp (such that it may self-align with the reservoir housing).

According to a further aspect of the invention there is provided a method of moulding battery components comprising the steps of: providing a two part mould, each mould part comprising a plurality of mould cavities; separating the mould parts and providing a supply of molten metal to each of the plurality of mould cavities with the mould parts at spaced apart locations; and moving the filled mould parts to an aligned position to form the battery components.

The method may further comprising the step of: providing a plurality of aligned battery plates (which may for example be arranged in one or more groups); and, after the step of moving the filled mould parts into an aligned position, positioning the plurality of battery plates relative to the mould such that a portion of the plurality of battery plates lie within the mould cavities; and allowing the molten metal to solidify so as to form a connection between the plurality of battery plates.

The method may further comprise moving the plurality of battery plates away from the mould to eject the moulded battery components from the mould. After ejection of the moulded battery components the step of separating the mould parts (and the subsequent steps) may be repeated to start a further moulding cycle.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF AN EMBODIMENT

Figure 1:
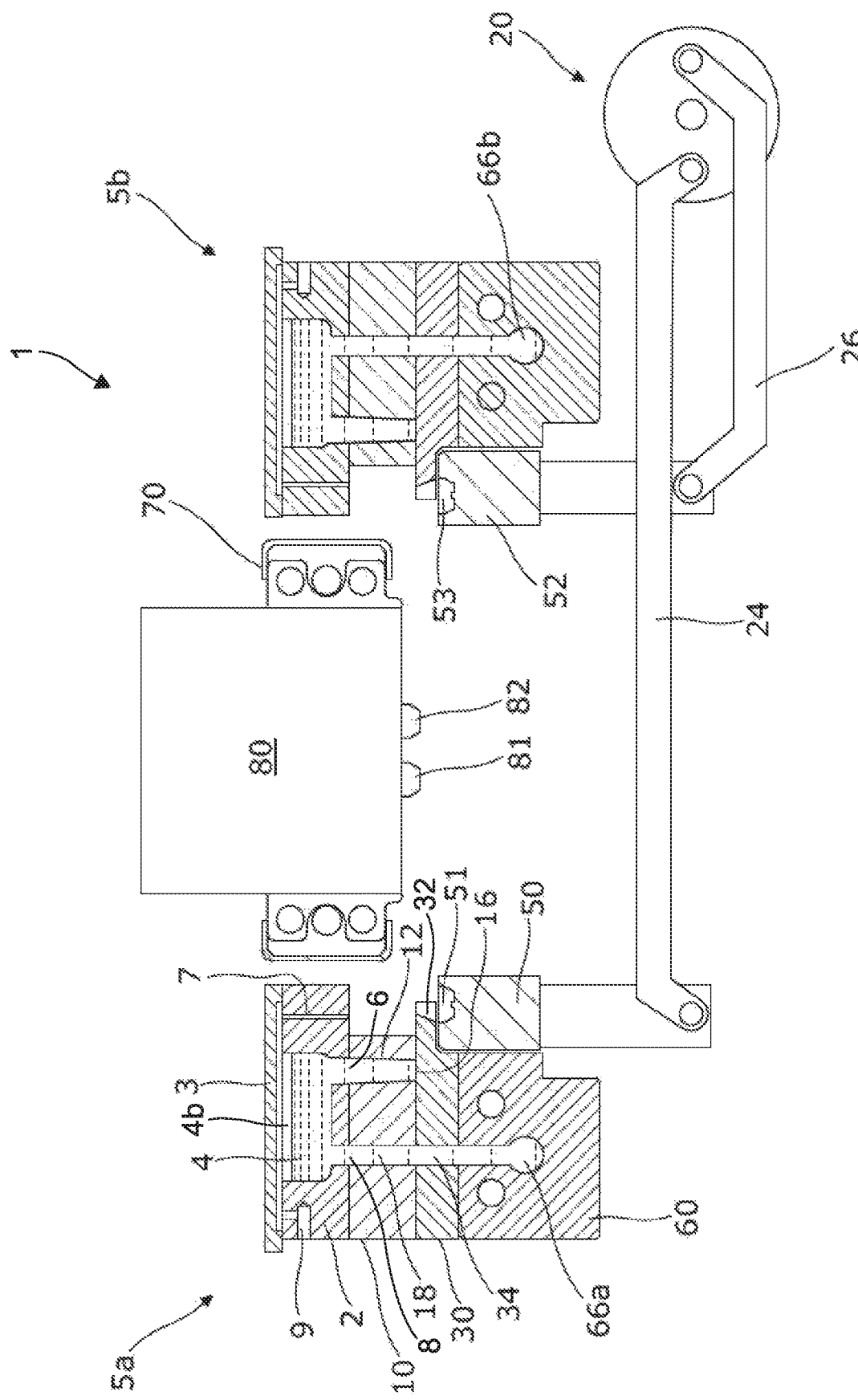
FIGS. 1 to 5 are schematic cross-sectional views of a cast on strap machine according to an embodiment of the invention showing the sequence of operation.

A cast on strap machine 1 in accordance with an embodiment of the invention is arranged to provide liquid lead into the mould cavities 51, 53 of a mould 50 before lugs (or tabs) 81, 82 of a set of battery plates 80 are moved into position by a jig box 70 with the lugs 81, 82 within the mould cavities 51, 53 and the lead can solidify so as to form straps connecting the lugs. As will be explained in further detail below, the mould 50 is formed of two mould bodies 50, 52 which each comprise a plurality of mould cavities 51, 53.

A lead delivery apparatus is provided for delivering a predetermined volume of lead to the mould 50. The basic operating principle of the lead delivery apparatus shown in the embodiment is as described in the applicants earlier UK Patent Application GB2507485. It will, however, be appreciated that other lead delivery arrangements could be used in embodiments of the invention. The illustrated lead delivery apparatus generally comprises a housing 2, which defines an inlet reservoir 4, a block 10 and a runway 30 on which the block 10 is slideably mounted. The delivery apparatus further comprises a drive arrangement (not shown for clarity) arranged to reciprocate the block 10 as shown in the sequential diagrams. The lead delivery apparatus is connected to a lead supply 60. It will be noted that in the illustrated embodiment a pair of identical lead delivery apparatus 5a, 5b are provided at opposing sides of the mould 50 and arranged to deliver to the opposing mould bodies 50 and 52. It will also be appreciated that the lead delivery apparatus will typically have a plurality of outlets 6 along its length (each corresponding to a separate cavity). Such outlets may be formed in a plurality of separate blocks and/or blocks with a plurality of cavities and it will be appreciated that this will depend upon the type of mould to be formed and therefore the invention may be used in a single or multiple arrangements.

The housing 2 defines a lead reservoir 4 in its interior and is generally arranged to have an open upper surface such that dross which accumulates may be easily skimmed from the lead in the reservoir 4. An inlet 8 is provided for the supply of lead and an outlet 6 is provided in the base of the reservoir. It will be appreciated that the cross sections shown in FIGS. 1 to 5 show only a section through a single cavity pair and associated lead delivery apparatus but typically a series of such arrangements will be repeated along the length of the apparatus.

The housing 2 may further be provided with a cover 3 which encloses the reservoir 4 but which is spaced apart from the lead fill level of the reservoir 4. A gas/air inlet 9 is provided at the rear of the housing 4 which extends into the ullage 4b over the reservoir. The housing 2 is further provided with a bleed opening 7 which (as described in below) is arranged to be aligned with the through cavity 12 when the block 10 is in the second position. The bleed opening 7 is in fluid communication with the ullage 4b of the housing 2.

Spaced apart from, and below, the housing 2 is a runway 30 which is arranged parallel to the lower surface of the housing 2 and defines a slot therebetween which is shaped and sized to receive a block 10. The runway 30 is provided with a through hole 34 aligned with the inlet 8 on the housing 2.

The block 10 is provided with a through cavity 12 and a through hole 18. In the non-displaced position of the block 10, the through hole 18 is aligned with the inlet 8 and through hole 34 to form the inlet path to the lead reservoir 4. In the same position, the through cavity 12 is aligned with the outlet 6 of the lead reservoir 4 and a blind hole (not shown) of the runway 30 such that lead from the reservoir will enter the blind hole and cavity 12.

FIG. 1 shows the apparatus in an initial position in which the mould blocks 50, 52 are in a fill position adjacent the lead delivery apparatus 5a and 5b. The block 10 is aligned such that the through cavity 12 is below the outlet 6 of the lead reservoir 4 and the through hole 18 is aligned with the inlet 8 of the lead reservoir 4. Thus, lead will flow through the supply 60 (which includes supply pipes 66a and 66b provided in a heated block), for example from a constant head lead supply (not shown) 60, and hole 34 in the runway 30 into the reservoir 4. The reservoir 4 will be maintained at a fill level. As the through cavity 12 is in fluid communication with the lead reservoir 4, a predetermined volume of lead will fill the cavity 12 and an additional volume of lead will enter the blind hole so as to provide a sump below the cavity 12.

It will be noted that in this step, the moulds 50, 52 are already positioned adjacent to the lead delivery apparatus 5a, 5b at the inner side of, and immediately below the end 32 of the runway 30. In other words, the moulds 50, 52 are in the "fill position". The supply 60 immediately adjacent to the moulds 50, 52 is heated (to maintain lead flow in the supply pipes 66a and 66b). A small air gap exists between the moulds 50, 52 and the supply 60 and, therefore, in this position the moulds 50, 52 are heated by radiant heat transfer.

Figure 2:
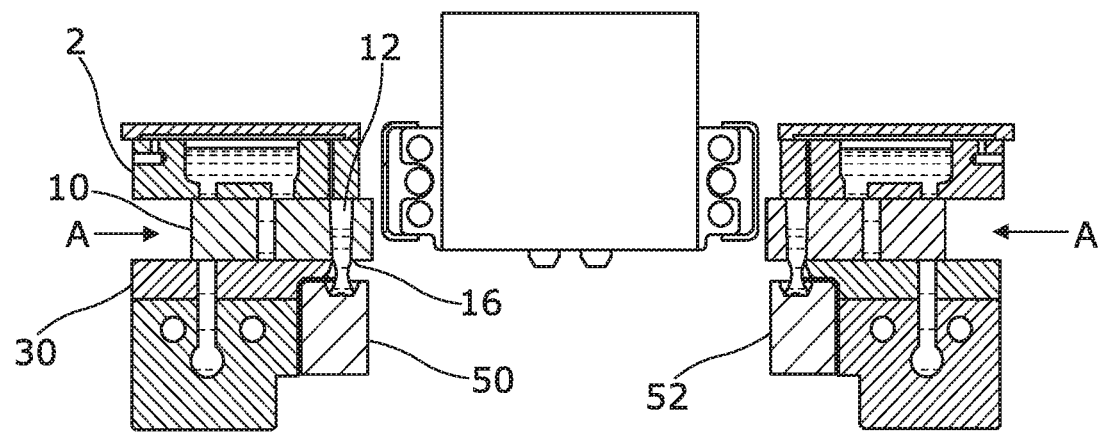

To commence filling of the mould, the mechanism is actuated to slide block 10 relative to the housing 2 and runway 30, as shown by the arrows A in FIG. 2. The block 10 slides inwardly towards the mould 50, 52 until it reaches its second position (as shown in FIG. 2) in which the delivery port 16 of the through cavity 12 is inward of the end 32 of the runway 30. In this position the through cavity 12 is directly overlying the cavity 51, 53 of the mould. In this position the bleed opening 7 provided in the housing 2 is in fluid communication with the inlet of the through cavity 12 such that gas may be drawn into the upper portion of the through cavity 12. This arrangement helps to avoid any vacuum effect which may hinder the release of the lead from within the through cavity 12.

Figure 3:
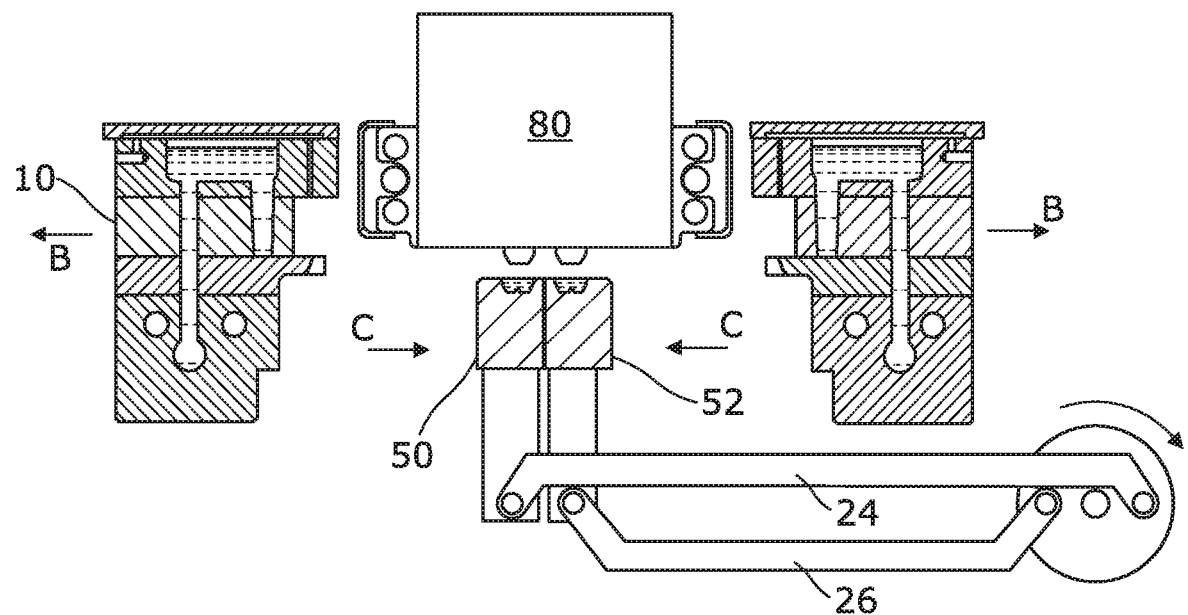

Once the lead pouring has been completed, the block 10 returns to its first position in which the through cavity is aligned with the outlet 6 of lead reservoir 4 (moving in the direction of arrows B shown in FIG. 3). In this position the reservoir 4 is again in fluid communication with the lead supply 60 such that the level of the reservoir will be replenished and the through cavity 12 will be refilled. At the same time, the drive mould mechanism 20 translates the moulds 50, 52 inwardly, as shown by arrows C, toward one another via the crank arms 24, 26. As such the mould parts 50, 52 are moved to the moulding position, shown in FIG. 3, in which the two halves 5a, 5b are abutting (or closely aligned) along a longitudinal centreline.

Figure 4:
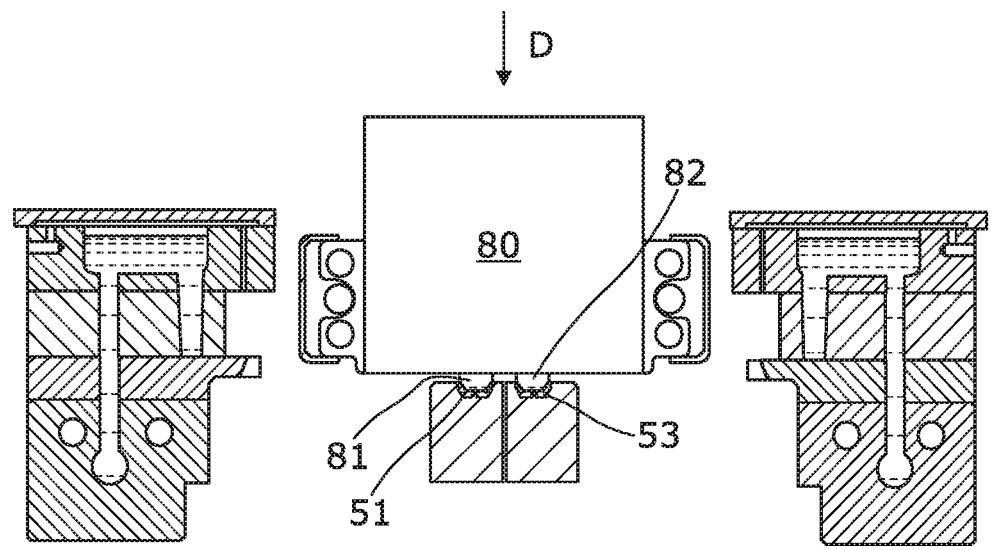

Subsequently, as shown in FIG. 4, the battery plates 80 are brought into position above the mould 50 by a downward motion (in the direction of arrow D) until the lugs 81, 82 of the plates lie within the mould cavity (which now contains molten but cooling lead).

Figure 5:
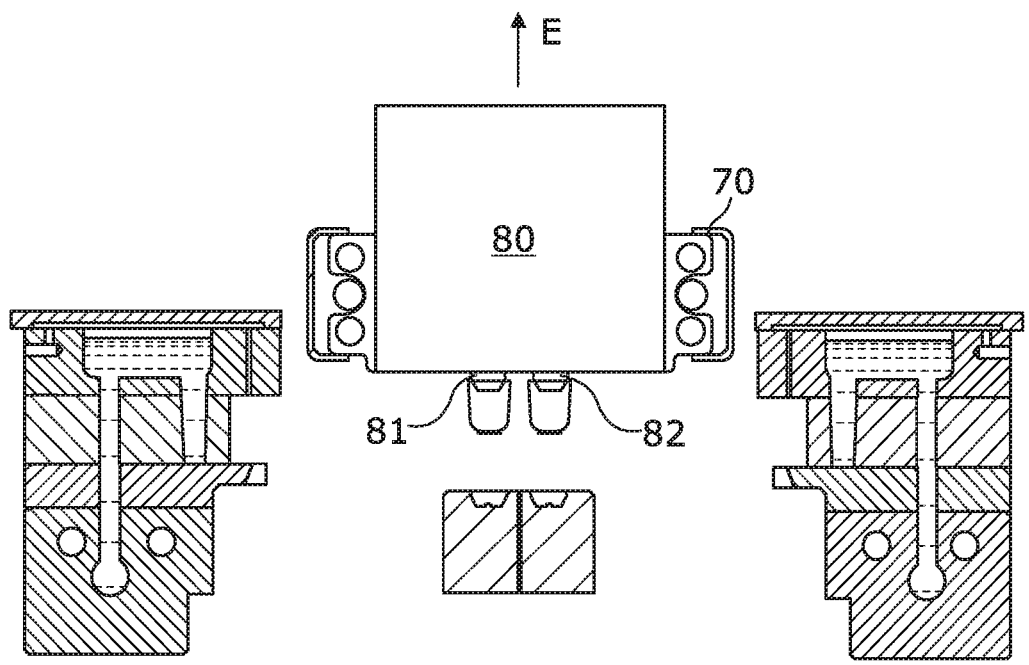

Finally, as shown in FIG. 5, the battery plates 80 are moved away from the mould 50 by the jig box 70 (in the direction of arrow E) and eject the formed straps with the lugs 81, 82. The forming procedure may then recommence by the mould bodies 50, 52 being moved back to the fill position by the drive 20.

Figure 6:
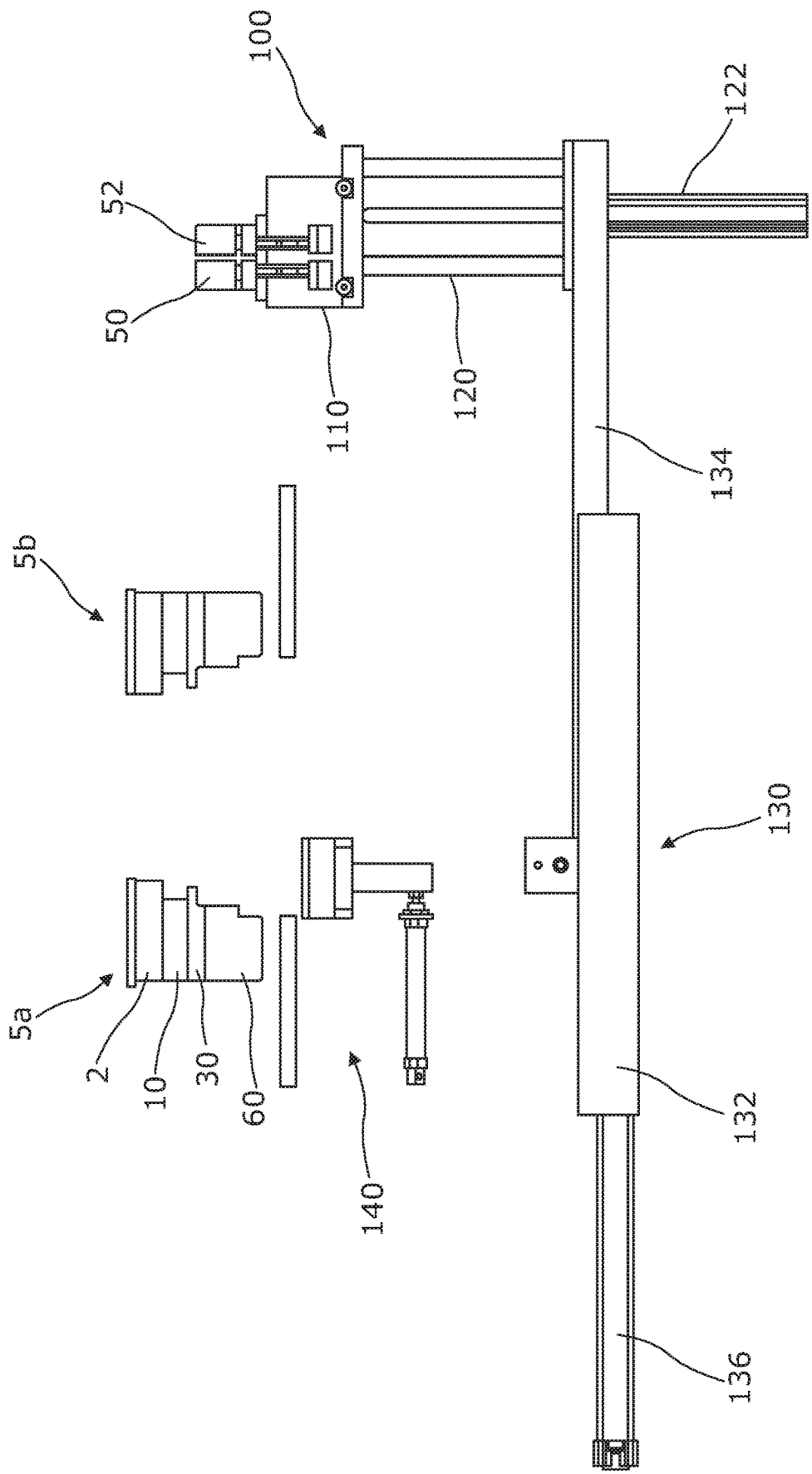
FIGS. 6 to 10 are schematic views of a cast on strap machine according to an embodiment of the invention including a mould loading apparatus and showing the loading sequence.

In some embodiments the cast on strap machine may further include a mould loading apparatus 100 as shown in FIG. 6. The mould loading apparatus 100 may automate the process of moving a mould between an internal, in use, position within the cast on strap machine and an external position in which the mould may be serviced, replaced or maintained. The mould loading apparatus 100 generally comprises a cradle 110, an elevator 120, a lateral position arrangement 130 and an ejection arrangement 140. The components of the loading apparatus 100 may be powered by suitable pneumatic cylinders (for example cylinder 136 for the lateral positioner and cylinder 122 for the elevator).

FIG. 6 shows an initial position in which the mould 50 is external to the cast on strap machine. The mould 50 has been loaded into and is supported by the mould cradle 110 on the elevator 120 (which is in a raised position for ease of access). The elevator 120 (and therefore the cradle 110 and mould 50) is external to the working area of the cast on strap machine due to the lateral position arrangement 130 being in an extended configuration with the sliding frame 134 displaced relative to the fixed frame 132.

Figure 7:
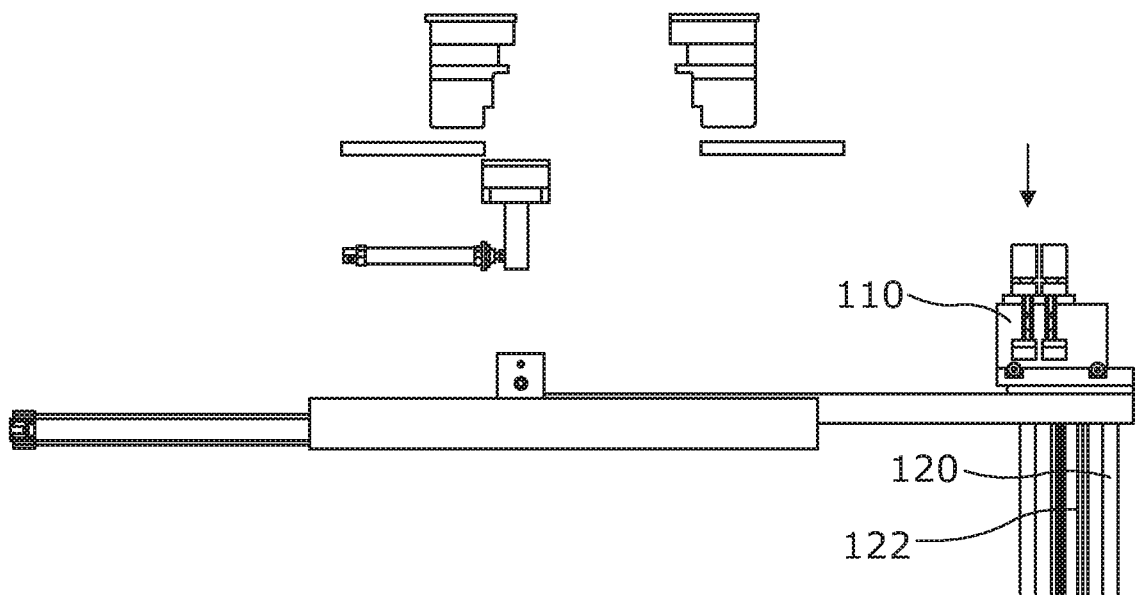
Figure 8:
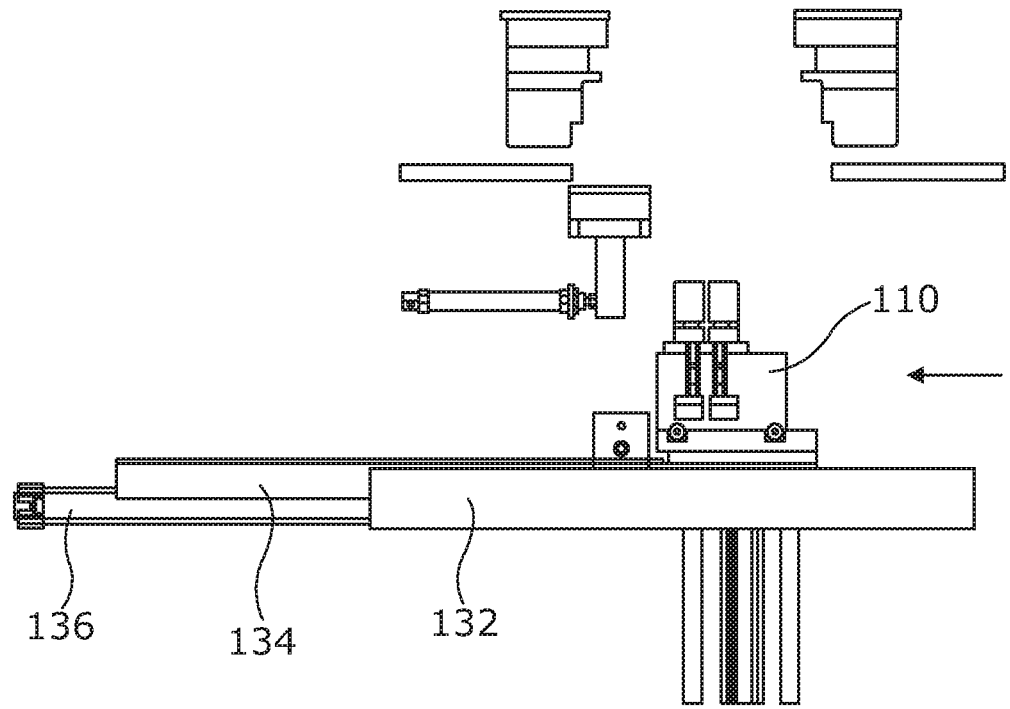
Figure 9:
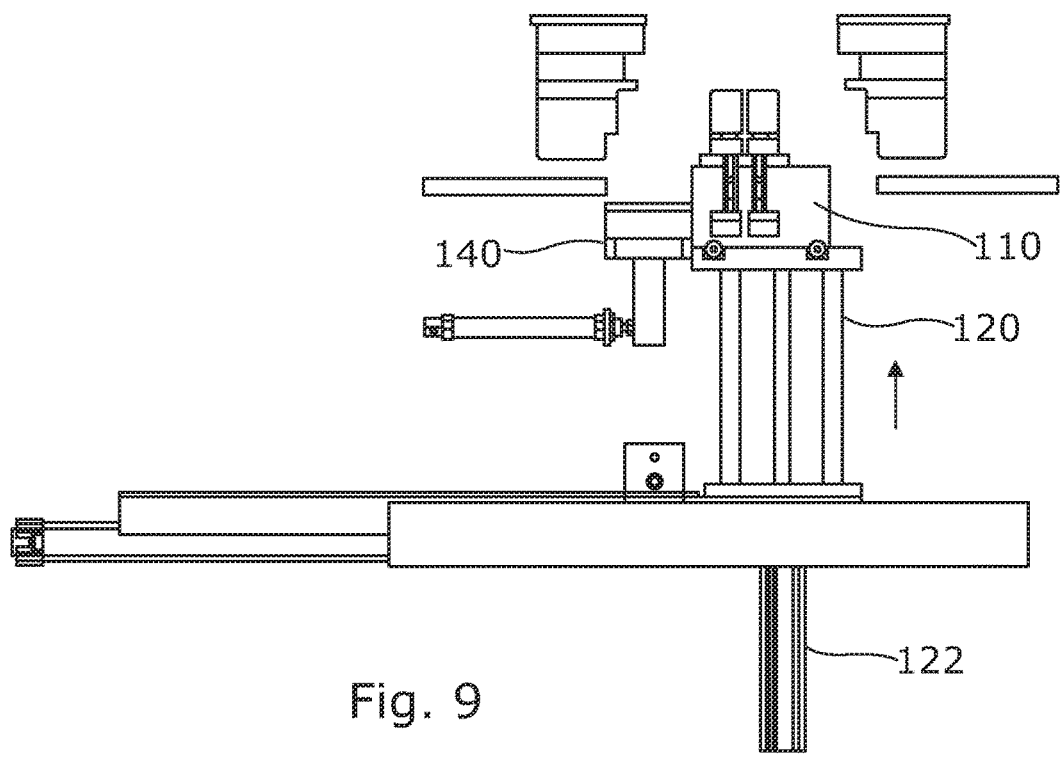
Figure 10:
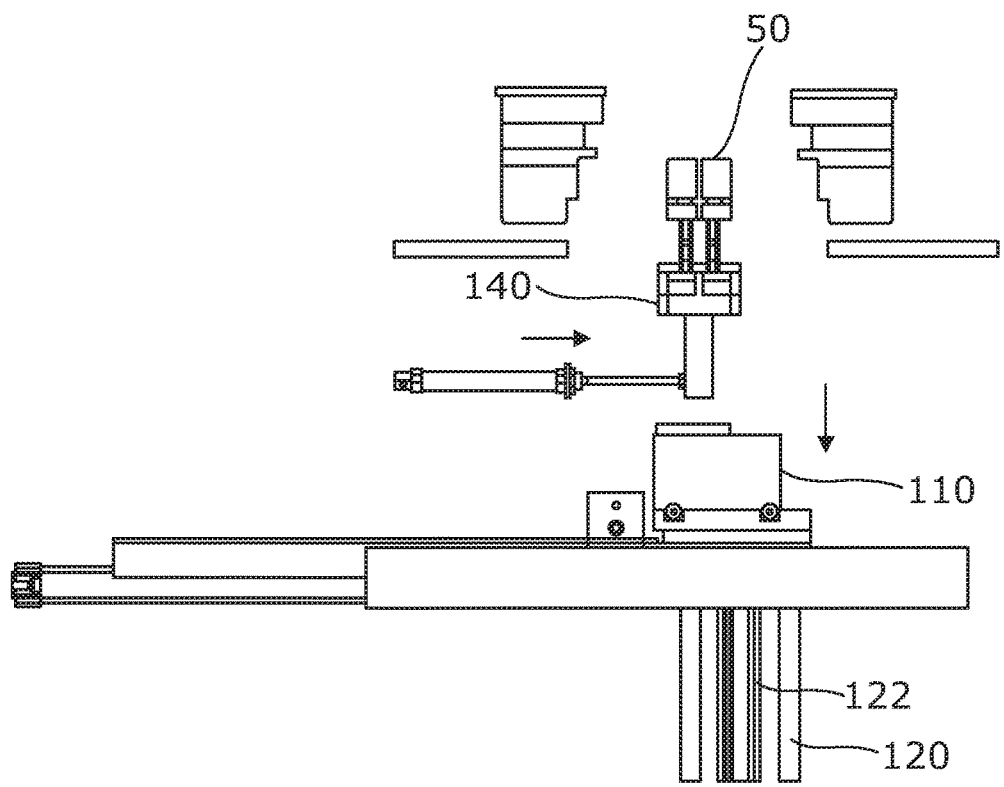

Initially, the elevator 120 is moved to its lowered position as shown in FIG. 7, such that it is below the plane of the base of the working section of the cast on strap machine (which is defined by a base below the lead delivery apparatus). The lateral positioner 130 is then used to move the elevator 120, cradle 110 and mould 50 inwardly into horizontal alignment with its operational position as shown in FIG. 8. The elevator 110 is then activated as shown in FIG. 9, to raise the mould 50 to its working position. An ejection arrangement 140 may then be activated to disengage the mould 50 from the cradle 110 (and may provide a support for the mould in use).

Figure 11A:
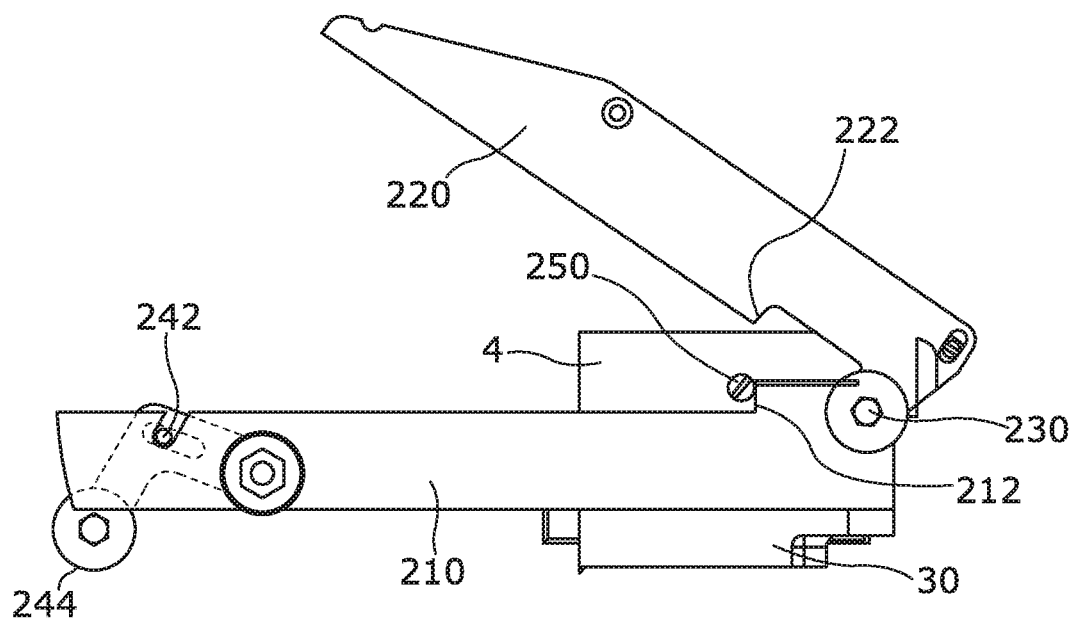
FIG. 11 is a schematic side view of the lead delivery apparatus for use in a cast on strap machine.
Figure 11B:
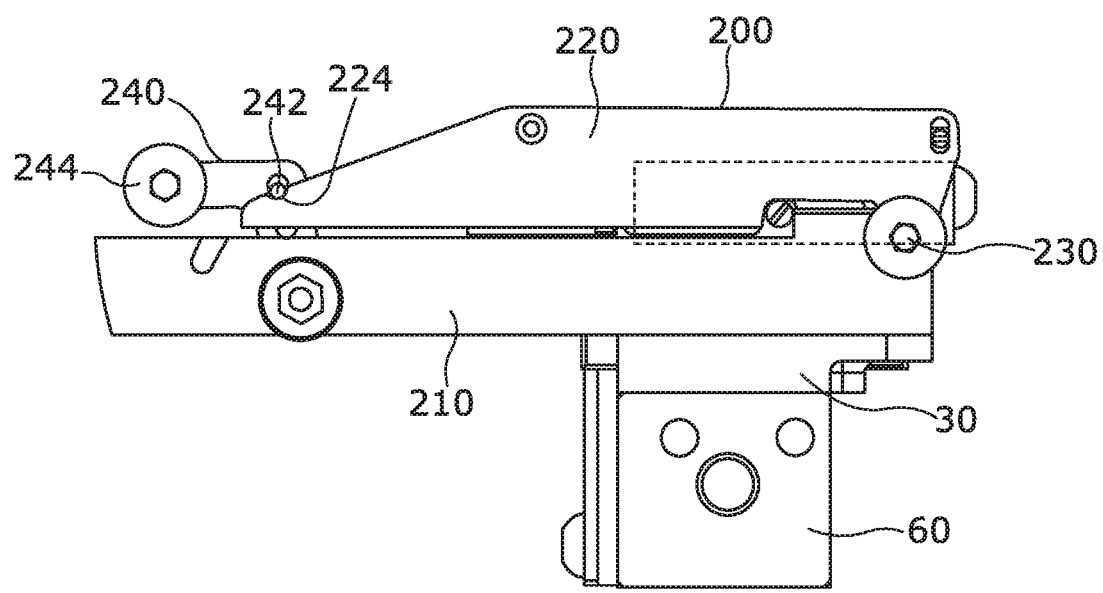

In order to provide ease of maintenance and/or interchanging of the sliding block 10 (for example to provide different volume measuring openings), embodiments may further include a clamping arrangement 200, as shown in FIGS. 11A and 11B, which comprises a clamp 200 arranged to selectively secure an upper portion of the housing 2 such that the housing 2 and/or block 10 may be removable.

The clamp 200, can be formed of a lower fixed clamp member 210, rigidly attached to the frame of the machine and an upper moveable clamp member 220 which is connected to fixed member 210 via a pivot 230. Thus, the moveable member 220 may be rotated between an open position shown in FIG. 11A and a closed position shown in FIG. 11B.

A fastener 240 in the form of a rotatable latch having a handle 244 is provided adjacent to an end of the moveable clamp member 220 which is distal to the pivot 230. The fastener 240 includes a latch member 242 which engages and retains a corresponding recess feature 224 formed on an upper surface of the moveable clamp member 220. It may also be noted that a notch or cut out is provided in the lower fixed clamp 210 to receive the latch member 242 in the open position (of FIG. 11A). This helps to ensure that the fastener 240 does not impede access to the sliding block 10.

As best seen in FIG. 11A, the clamping arrangement 200 is substantially aligned with the housing 2 of the reservoir 4 (and the sliding block 10 is, in the view of FIGS. 11A or 11B, concealed behind the lower, fixed arm of the clamp). The housing 2 is provided with a projection 250 on the side of its outer body for engagement by the clamp 200. With upper moveable clamp member 220 rotated into the open position, the sliding block 10 may be positioned within the lead delivery apparatus followed by the reservoir housing 2 being placed over the sliding block 10. The reservoir 4 may be aligned correctly by positioning the projection 250 against a step feature 212 formed in the upper edge of the fixed clamping member 210. When the upper moveable clamp member 220 is rotated downwardly into the clamped position of FIG. 11B, it will be noted that a corresponding step feature 222, formed in the lower edge of the moveable clamping member 220 is brought into alignment with the projection 250. Thus, it will be seen that the clamp opposing step features 212, 222 jointly form an aperture for fixably retaining the projection 250 when the clamp 200 is in the closed configuration. The clamp 200 will, therefore, fix the housing 2 relative to the clamp, and the body of the delivery apparatus.

It may also be noted that the clamp 200 also carries the reservoir cover 3, which is rotatably connected to the upper moveable clamping member 220 via a pivot. Thus, as the clamp 200 is closed, the reservoir cover 3 may self-align with the upper portion of the reservoir housing 2 and close the upper end thereof.

Although the invention has been described above with reference to one or more preferred embodiments, it will be appreciated that various changes or modifications may be made without departing from the scope of the invention as defined in the appended claims.

For example, the skilled person will appreciate that while the embodiment above has been primarily described in relation to the forming of straps, other formations may also be cast onto the lugs of battery plates (for example posts) and that a cast on strap machine may be used for the formation of any such formations without departing from the scope of the invention.

In some embodiments it may be advantageous to provide a plurality of cavities 12 arranged to deliver lead to a single mould cavity. For example, this may be desirable for relatively large mould cavities. The plurality of cavities could be in multiple blocks or in a single multiple cavity block. For example, each cavity may measure a separate volume of lead and the total volume of the cavities may provide the volume require for the particular mould cavity. The cavities may for example deliver to different areas of a single mould cavity to ensure an even distribution of lead.

Further, whilst the described embodiment utilises a mould which is split into two, elongate, longitudinal halves it will be appreciated that the particular arrangement may depend upon the particular configuration of the mould which is being cast. For example, in some embodiments it may be possible to divide the mould into more than two mould bodies (at the expense of potential increased complexity).

The invention claimed is:

1. A cast on strap machine for moulding battery components, the machine comprising:
   a molten metal delivery apparatus;
   a battery plate positioning device; and
   a mould comprising a first mould body comprising a first plurality of mould cavities and a second mould body comprising a second plurality of mould cavities; and
   wherein the machine further comprises
   a mould positioner configured to move the first mould body and the second mould body between:
   a moulding position in which the first plurality and second plurality of mould cavities are in an aligned position, and are aligned relative to the battery plate positioning device; and
   a fill position in which the first plurality and second plurality of mould cavities are displaced from the aligned position, and are proximal to an outlet of the metal delivery apparatus.

2. A cast on strap machine as claimed in claim 1, wherein the molten metal delivery apparatus comprises first and second molten metal delivery apparatuses associated respectively with the first and second mould bodies.

3. A cast on strap machine as claimed in claim 2, wherein the first and second molten metal delivery apparatuses are fed from a common lead supply.

4. A cast on strap machine as claimed in claim 2, wherein the first and second molten metal delivery apparatuses each comprise a plurality of outlets with one outlet associated with each of the mould cavities.

5. A cast on strap machine as claimed in claim 4, wherein each of the plurality of outlets is associated with a local molten metal reservoir.

6. A cast on strap machine as claimed in claim 1, wherein the outlet comprises a through cavity formed in a slidably mounted block and arranged to receive lead into the upper end of the through cavity when the block is in a first position and to release lead from the lower end of the through cavity when the block is in a second position.

7. A cast on strap machine as claimed in claim 1, wherein the outlet is arranged to dispense lead directly into a mould cavity when the mould bodies are in the fill position.

8. A cast on strap machine as claimed in claim 1, wherein the mould positioner is arranged to slide the first mould body and the second mould body linearly outwardly away from a nominal longitudinal centre line of the mould when moving from the moulding position to the fill position.

9. A cast on strap machine as claimed in claim 8, wherein the mould position includes a crank mechanism connected to the first and second mould bodies.

10. A cast on strap machine as claimed in claim 9, wherein the molten metal delivery apparatus is configured such that when the first and second mould bodies are in the fill position, the mould bodies are heated by radiant heat transfer from the delivery apparatus.

11. A cast on strap machine as claimed in claim 1, further comprising a mould loading apparatus.

12. A method of moulding battery components comprising the steps of:
    providing a cast on strap machine as claimed in claim 1;
    separating the first mould body and the second mould body; and,
    providing a supply of molten metal to each of the plurality of mould cavities with the first mould body and the second mould body at spaced apart locations; and, when filled,
    moving the filled first mould body and the second mould body to an aligned position to form the battery components.

13. A method of moulding battery components as claimed in claim 12, further comprising the steps of:
    providing a plurality of aligned battery plates; and,
    after the step of moving the filled mould parts into the aligned position, positioning the plurality of battery plates relative to the mould such that a portion of the plurality of battery plates lie within the mould cavities; and,
    allowing the molten metal to solidify so as to form a connection between the plurality of battery plates.

14. A method of moulding battery components as claimed in claim 13, wherein the method further comprises moving the plurality of battery plates away from the mould to eject the moulded battery components from the mould.

15. A method of moulding battery components as claimed in claim 14, wherein, after ejection of the moulded battery components, the step of separating the mould parts is repeated to start a further moulding cycle.

* * * * *